United States Patent
Driscoll et al.

(10) Patent No.: US 10,581,808 B2
(45) Date of Patent: Mar. 3, 2020

(54) KEYED HASH CONTACT TABLE

(71) Applicant: Microsoft Technology Licensing, LLC, Redmond, WA (US)

(72) Inventors: Daniel J. Driscoll, Seattle, WA (US); James H. Lewallen, Fall City, WA (US); Christopher C. McConnell, Redmond, WA (US); Thomas M. Laird-McConnell, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 380 days.

(21) Appl. No.: 15/467,876

(22) Filed: Mar. 23, 2017

(65) Prior Publication Data

US 2018/0278586 A1 Sep. 27, 2018

(51) Int. Cl.
| | |
|---|---|
| H04K 1/00 | (2006.01) |
| H04L 29/06 | (2006.01) |
| H04L 9/06 | (2006.01) |
| H04W 4/14 | (2009.01) |
| G06F 21/64 | (2013.01) |
| G06F 16/31 | (2019.01) |
| H04L 12/58 | (2006.01) |

(52) U.S. Cl.
CPC ........ *H04L 63/0428* (2013.01); *G06F 16/325* (2019.01); *G06F 21/64* (2013.01); *H04L 9/0643* (2013.01); *H04L 9/0662* (2013.01); *H04L 51/22* (2013.01); *H04W 4/14* (2013.01); *H04L 2209/80* (2013.01)

(58) Field of Classification Search
CPC ..... G06F 21/64; G06F 16/325; H04L 9/0643; H04L 63/0428; H04L 51/00; H04L 51/04; H04W 4/14
See application file for complete search history.

(56) References Cited

U.S. PATENT DOCUMENTS

| | | | |
|---|---|---|---|
| 7,203,315 B1 | 4/2007 | Livesay | |
| 7,299,358 B2 | 11/2007 | Chateau et al. | |
| 8,627,111 B2 | 1/2014 | Kirshenbaum | |
| 8,935,797 B1 | 1/2015 | Silver et al. | |
| 9,202,078 B2 | 12/2015 | Abuelsaad et al. | |
| 9,202,085 B2 | 12/2015 | Mawdsley et al. | |

(Continued)

FOREIGN PATENT DOCUMENTS

WO 2010113043 A2 10/2010

OTHER PUBLICATIONS

"Public Key Encryption and Digital Signature: How do they work?", In White Paper of CGI, 2004, pp. 1-12.

*Primary Examiner* — Trong H Nguyen

(74) *Attorney, Agent, or Firm* — Shook, Hardy & Bacon, L.L.P.

(57) ABSTRACT

In an example, a method includes receiving a data package, the data package including a contact identification and a message payload; in response to determining that a key for the contact identification does not exist in a contact table: generating a key for the contact identification; and updating the contact table with the generated key to indicate an association between the key and the contact identification; calculating a hashed identification based on the generated key and contact identification; and associating the message payload with the hashed identification in a message table.

19 Claims, 5 Drawing Sheets

(56) References Cited

U.S. PATENT DOCUMENTS

| | | | |
|---|---|---|---|
| 9,432,342 B1 | 8/2016 | Kothari et al. | |
| 10,318,762 B1* | 6/2019 | Buckingham | G06F 21/6254 |
| 2003/0163691 A1* | 8/2003 | Johnson | H04L 29/06 |
| | | | 713/168 |
| 2007/0092072 A1* | 4/2007 | Jacobs | G06Q 10/107 |
| | | | 379/142.06 |
| 2009/0193512 A1* | 7/2009 | Buckley | H04L 29/12047 |
| | | | 726/9 |
| 2009/0217049 A1 | 8/2009 | Seehaweru | |
| 2011/0010563 A1 | 1/2011 | Lee et al. | |
| 2013/0080774 A1 | 3/2013 | Combet et al. | |
| 2014/0281491 A1 | 9/2014 | Zaverucha et al. | |
| 2014/0301548 A1* | 10/2014 | Thorpe | H04L 9/0861 |
| | | | 380/44 |
| 2015/0149695 A1 | 5/2015 | Khan et al. | |

* cited by examiner

__US 10,581,808 B2__

KEYED HASH CONTACT TABLE

TECHNICAL FIELD

Embodiments described herein generally relate to use of cryptographic algorithms, and, in particular but without limitation, to a keyed hash contact table.

BACKGROUND

Hash functions are generally used to map an arbitrary length input string to a fixed size. Cryptographic hash functions are a special class of hash functions that share a set of features that make them more suitable for security use cases (e.g., verifying integrity of transmitted messages, storing passwords, etc.). A common feature of a good cryptographic hash function is that a small change in an input string will map to a drastically different hash. For example, "Sample Text" maps to "35AE8855DB . . . " using the SHA-256 algorithm, but "sample Text" maps to "84A4D6C6E9 . . . ." Another property of a good cryptographic function is that it is computationally prohibitive to convert from the hash back to the input string.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 4 illustrates a flowchart of a method of processing a data package, according to various examples; and in which

DETAILED DESCRIPTION

Figure 1:
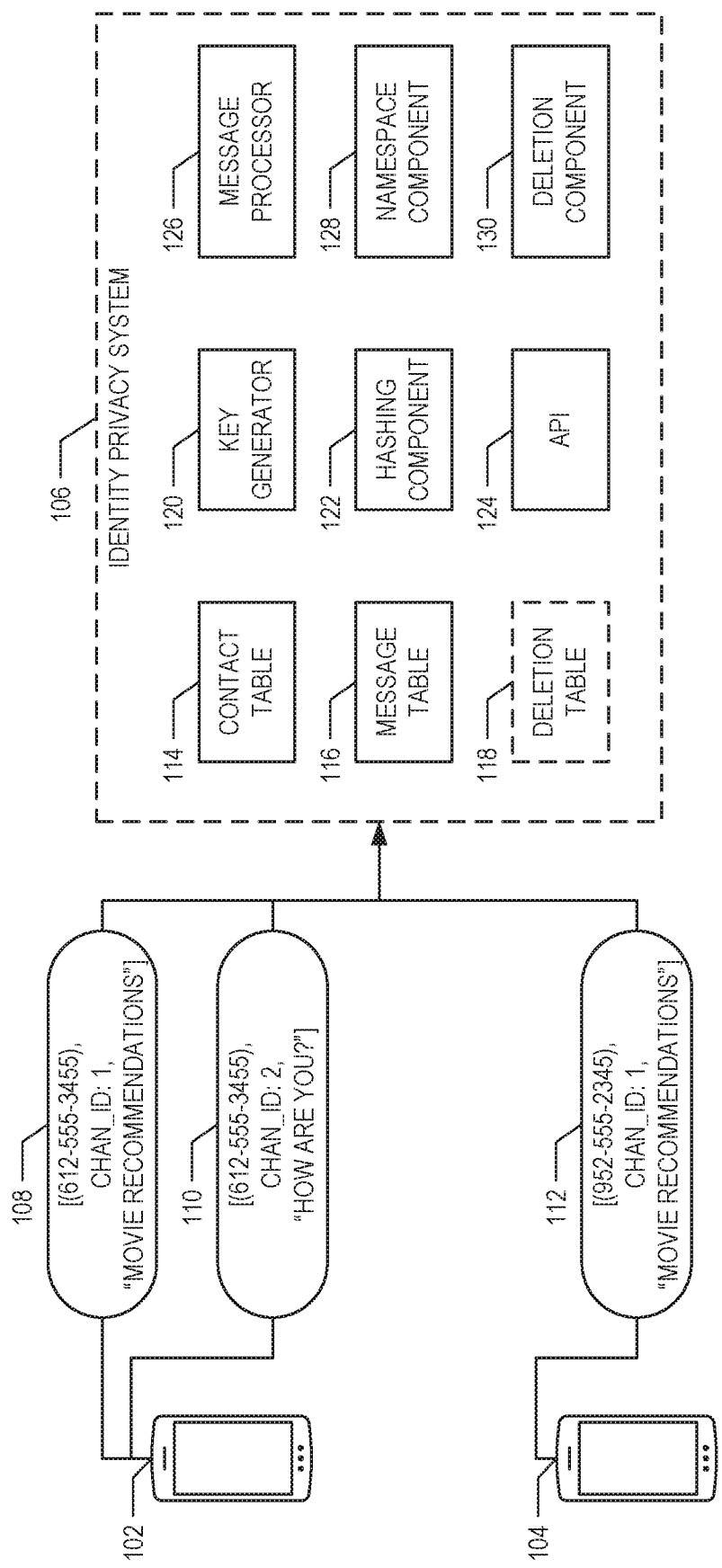
FIG. 1 illustrates a schematic diagram of an identity privacy system, according to various examples.

In the following description, for purposes of explanation, numerous specific details are set forth in order to provide a thorough understanding of some examples. It will be evident, however, to one skilled in the art that the present invention may be practiced without these specific details Users may communicate with each other through a messaging platform. In some instances, a user may be a computer program, more commonly referred to as a chatbot. For convenience, this disclosure may refer to human users of a messaging platform as a "user," and computer program participants of a messaging platform as a chatbot. Example messaging platforms include, SKYPE®, Messenger on FACEBOOK®, Slack, KIK™ Messenger, and Short Message Service (SMS) text messages.

A messaging platform may operate on one or more network-connected computing devices. In some instances, the entity that owns the messaging platform may contract with another company to host the messaging platform, for example, on a cloud computing platform. Cloud computing platforms (e.g., virtual servers, virtual PCs, etc.) generally allow a company or individual to rent of access computing servers/storage/power on demand. Thus, as usage and computational needs of the messaging platform increases, the rented computing resources may scale accordingly, with no disruption to the messaging platform. Example cloud infrastructure providers are MICROSOFT AZURE® and AMAZON EC2®.

One trait of many messaging platforms, regardless of the executing infrastructure, is storage of messages transmitted over the message platform. Among other reasons, storage may permit a user to access their messages from multiple computing devices, archival of messages, and performance of data analytics of message content. The messages may be stored using a variety of storage techniques including, but not limited to, relational databases and multi-dimensional databases such as Online Analytical Processing (OLAP) database systems. For discussion purposes, many of the examples herein discuss data as stored in tables of a relational database, however, other storage paradigms may be used without departing from the scope of this disclosure.

By analyzing the stored messages, an entity may determine the popularity of certain topics, track trend data, etc. In a traditional message table—as stored in a database, for example—there may be two columns: (1) a contact identifier; and (2) encrypted message content. In this scenario, a single SQL query may be used to retrieve all messages for a particular user.

Because of the sensitive nature of the message content, a messaging platform operator may wish to enhance security of the storage of the messages. In particular, the operator may want to safeguard the link between message content and an end-user. The systems and methods described herein, among other advantageous, may protect an end-user's privacy by using cryptographic techniques to make it technologically infeasible to link message content back to an identifiable user.

In some instances, it may be technologically disadvantageous to have a clear link between end-users and their messages. For example, if a message table as described above is leaked, no additional work is needed to link potentially personally identifiable information (PII) in the messages to a particular user. Furthermore, many users may not want to have PII (e.g., phone numbers, names, physical addresses, e-mail addresses, social security numbers, etc.) so readily associated with their names. Another technical disadvantage is the computing time it takes to remove all entries for a given user. Because each message is stored with the contact information, the entire message table may need to be scanned to find and remove all message entries for the user.

To alleviate some of the problems above, some existing solutions use an intermediate anonymizing table to obfuscate a user from the user's messages. In such a scenario, a contact table may only store contact information (e.g., a phone number) for the user, but not the messages. The anonymizing table may store an association between the contact information and a random number (e.g., "555-555-1234, 453235"). The message table may then store the message as associated with the random number (e.g., "453235, 'Hello'"). Removing the association between a user and their messages becomes a single operation—deleting the entry in the anonymizing table for the user.

Anonymizing tables have their own technological weaknesses, however. For example, it is trivial to get find out the contact information for a user by querying the anonymizing table for the random number in the messaging table. In other words, the security of the anonymization is only as good as the business practices of keeping the tables secret and separate.

Various examples are described herein that provide, among other benefits, anonymizing users from their messages while also making it computational expensive to obtain a user's contact information from the message table alone. As described in greater detail herein, a contact table may include a contact information field and a key field. A hashed identification may be computed based on the values in the contact information and the key fields, but not stored in a separate anonymizing table. The hashed identification may be associated with message content in a message table. In various examples, the message content is encrypted in the message table.

Because of the nature of a cyptographic hash, it may be impractical if not impossible to determine the contact identification from the hashed identification. Thus, unless a hash is computed for each contact in the contact table, an entity may not be able to link a message to a specific contact. Given a large contact table, computing all the hashes may be too computationally expensive to implement. As a further security feature for even small contact tables, a portion of the key may be stored with the user and another portion in the contact table. Accordingly, even if a malicious actor had the contact table and the message table, the actor would be not able to link the hashed identification to the user.

FIG. 1 illustrates a schematic diagram of an identity privacy system, according to various examples. FIG. 1 includes computing device 102, computing device 104, and identity privacy system 106. Identity privacy system 106 is illustrated as including contact table 114, message table 116, deletion table 118, key generator 120, hashing component 122, Application Programming Interface (API) 124, message processing 126, namespace component 128, and deletion component 130. Computer device 102 is illustrated as sending data package 108 and data package 110 to identity privacy system 106. Computing device 104 is illustrated as sending data package 112 to identity privacy system 106.

Although the elements of identity privacy system 106 are illustrated as part of a single system, the elements may be geographically dispersed or duplicated across multiple computing devices. Additionally, functionality of one components may be performed by another component (e.g., message processing 126 may perform key generation). The labels of the elements of identity privacy system 106 are illustrative in nature and other labels may be used. The functionality attributable to an element may be performed by executing machine-readable program code, which has been stored on a storage device (not shown), on a processing unit (e.g., a general purpose computer, a graphical processing unit, application specific integrated circuit, etc.). In various examples, functionality is performed on a computing system such as that depicted in FIG. 5, discussed in more detail herein.

The elements in FIG. 1 may communicate over a network (not shown). The network may include local-area networks (LAN), wide-area networks (WAN), wireless networks (e.g., a IEEE 802.11 wireless local area network or a cellular wireless wide area network), the Public Switched Telephone Network (PSTN) network, ad hoc and device-to-device (D2D) networks, personal area networks (e.g., Bluetooth) or other combinations or permutations of network protocols and network types. The networks may include a single local area network (LAN) or wide-area network (WAN), or combinations of LAN's or WAN's, such as the Internet. The various devices coupled to network may be coupled to the network via one or more wired or wireless connections.

Identity privacy system 106 may be part of a larger computing system (not illustrated). For example, identity privacy system 106 may be a software component for a bot framework. The bot framework may provide services for quickly deploying the same chatbot to multiple messaging platforms. Identity privacy system 106 may be used to disassociate contact information from message content received by the chatbot. Identity privacy system 106 may be executed on a cloud computing platform. Multiple chatbots may be hosted on the same cloud computing platform.

Although many of the examples herein refer to users communicating with chatbots, identity privacy system 106 may be used by other systems that have a need to disassociate user identification from content. For example, users may communicate with an artificial intelligence system via voice and received audio content may be disassociated from the user for later analysis against a population of users. Additionally, the techniques described herein may be used by a messaging platform that does not even permit bots. In another example, identity privacy system 106 may be used to disassociate user preferences (e.g., placement of user interface elements) from a user. This may allow analysis of user interface preferences of a population of users without directly identifying the users.

Additionally, for simplicity, data packages 108, 110, 112 are illustrated as transmitted directly to identity privacy system 106. In some instances, data packages 108, 110, 112 may first be received at a messaging platform, where they may be forwarded to identity privacy system 106. This may occur, for example, when a user of computing device 102 (e.g., mobile phone, tablet, laptop, desktop computer, etc.) is communicating with a chatbot on a messaging platform. The messaging platform may be hosted on a first set of computing devices, whereas the chatbot may be hosted by a second set of computing devices (e.g., as part of the same set of devices as identity privacy system 106). Thus, a user's initial transmission of a message to a chatbot may arrive at the messaging platforms servers first. The messaging platform may then access configuration data for the chatbot which indicates where to forward the message to obtain a response (e.g., identity privacy system 106).

Data package 108 is illustrated as including three data values, a contact identification (612-555-3455), a channel identification (Chan_ID '1') and a message payload (e.g., "Movie Recommendations"). Data package 110 and Data package 112 similarly include three data values. A data package may have more or fewer data values without departing from the scope of this disclosure. For example, as part of hosting the chatbot, a cloud computing platform may generate an API key for the chatbot. The key may be received as part of an API call to API 124. Without a valid API key, identity privacy system 106 may ignore the call. The format of data packages 108, 110, 112 are for illustration purposes and other formats may be used. For example, data package 108 may be formatted in JavaScript Object Notation (JSON) and transmitted to identity privacy system 106 over API 124.

A contact identification may identify a user of a messaging platform. The same contact identification may exist across multiple messaging platforms. For example, many messaging platforms use a phone number of the user as the identification. Other contact identifications may be used such as usernames, an internal messaging platform identification, etc. The contact identification does not inherently personally identify the user in a context outside of the messaging platform (e.g., user1235 does not inherently mean "Alice Jones"). In some instances, a user may use the same username across multiple messaging platforms.

To be able to distinguish between different messaging platforms, where a user may have a common identifier, namespaces may be used. Namespaces may also be used when identity privacy system 106 hosts multiple chatbots that are in communication with the same user. FIG. 1 illustrates one implementation of namespaces—channel identification. The channel identification may be part of a data package or be inferred (e.g., by API key, originating messaging platform). As illustrated, data package 108 and data package 110 both are using channel ID '1' and data package 110 is using channel ID '2.' In some examples, two identifiers may be used, one to identify the messaging platform, and one to identify the chatbot that the user is communicating with. The channel identification may identify a namespace based on the originating messaging platform, in an example. Additional examples of how the channel identification may be used with respect to namespace component 128 are discussed below.

In an example, contact table 114 is a table with at least two columns, a contact information field and a key field. Message table 116 may include at least two columns, a hashed identification column and a message payload column. In various examples, contact table 114 and message table 116 do not have entries entry directly linking a contact identification to a hashed identification.

As an example, consider that user is interacting with a chatbot on computing device 102 and has just sent a message for "movie recommendations." The interaction may be initiated by the user opening an application stored in on a storage device of computing device 102. The application may be associated with a messaging platform. The user may indicate a desire to chat with the chatbot by clicking the name of the chatbot from a list of the user's contacts. The user may then enter a message and activate a user interface element to transmit the message.

The messaging platform may receive the message, along with metadata indicating that the desired recipient is the chatbot. The messaging platform may then format an API call to identity privacy system 106. In an example, formatting the API call may be completed at the computing device 102. The format of the API call may be set by API 124. API 124 may define API calls according to Representational State Transfer (REST) or RESTful practices. API 124 may define an HTTP POST call to store messages. The call may include required and optional parameters.

Data package 108 illustrates examples values for three parameters: (1) a contact identification parameter, (2) a channel identification parameter, and (3) a message payload parameter. In some examples, the name of the parameter is included in the data package. The values in data package 108 may be encrypted prior to transmission to identity privacy system 106.

Once received at identity privacy system 106, data package 108 may be processed by message processing 126. Because the format of the API call is set at the time the API is created, message processing 126 may parse data package 108 to retrieve the contact identification, channel identification, and message payload.

Initially, message processing 126 may query contact table 114 to determine if an entry for the received contact identification exists. In some instances, the contact identification may be modified before the query is made. For example, sometimes a contact identification may be formatted "612-555-3455" whereas in other instances it may be formatted "(612) 555-3455" or "6125553455." Accordingly, translation rules (remove all '-', '(', etc.) may be utilized to modify the contact identification into a standardized format. Different translation rules may be stored for different messaging platforms and chatbots.

The contact identification may be further modified if namespacing is desired. For example, namespace component 128 may store a set of rules for how to prepend or append data to a contact identification based on received (or inferred) channel identification (e.g., "sky_612-555-1234" and "fbm_612-555-1234"). For example, a table may be stored that includes entries for different channel identifications and a character string to prepend or append to the contact identification. Therefore, messages for the same contact identification, but different users, messaging platforms, etc., may be separated and the same base contact identifier may be stored or be used multiple times. In further examples, different contact and message tables are used for different messaging platforms to avoid contact identification name collisions.

The, optionally standardized and namespaced, contact identification may be used as a query input to contact table 114. If the contact identification is not present in the contact table, a new entry may be created. As part the entry creation, key generator 120 may generate a random key for the contact identification. The key may be generated by a cryptographically secure pseudo-random number generator or cryptographic pseudo-random number generator in various examples. The random number generator may be dedicated hardware of identity privacy system 106. A fixed key length (e.g., 128 bits) may be used each key.

It is foreseeable that multiple data packages for the same contact identification may be received before a key may be generated in contact table 114. To prevent multiple concurrent requests, a lock (e.g., a mutex) may be placed on key generator 120. Before a subsequent request to key generator 120, contact table 114 may be queried again to see if a key has been generated. In another example, a queue of contact identifications may store of outstanding key generation requests. The queue may be checked if a request has already been made before a new request is made to key generator 120 for a contact identification.

The generated key may be stored as associated with the contact identification in contact table 114. In an example, being associated means that a stored relationship exists between the contact identification and the generated key. For example, a row may exist in contact table 114 with the value of the contact identification and the value of the generated key.

The key generated by key generator 120 may be split into at least two portions. For example, for length X, a first portion may be character positions 1 through (X/2)−1 and the second portion may be position (X/2) to the end. The split may be unequal in some examples (e.g., ¼ and ¾ split). Noncontiguous splits may also be used, such as every other character. One of the portions of the key may be stored as associated with the contact identification and another portion may be transmitted back to computing device 102 or a third party. In this manner, even if a malicious actor has contact table 114, it will only have part of the key necessary to compute the hashed identification.

After key generator 120 generates the key for a contact identification, hashing component 122 may compute a hashed identification. The hashed identification may be computed using a cryptographic hashing algorithm based on the contact identification, the key, and an initialization vector (IV). The format of the input to the hash algorithm may be standardized. For example, (contact_identification-|random key). The IV may be set according to a chosen cryptograph hashing algorithm (e.g., SHA-2 or SHA-3 families of algorithms) or be set according to identity privacy system 106. The type of hash algorithm used may be the same for each contact identification and channel, in some examples. In other examples, the hash algorithm selected may be determined at runtime. An entry may be added to message table 116 that associates the message payload with the hashed identification. In an example, there is not a column for the contact identifier in message table 116.

Figure 2:
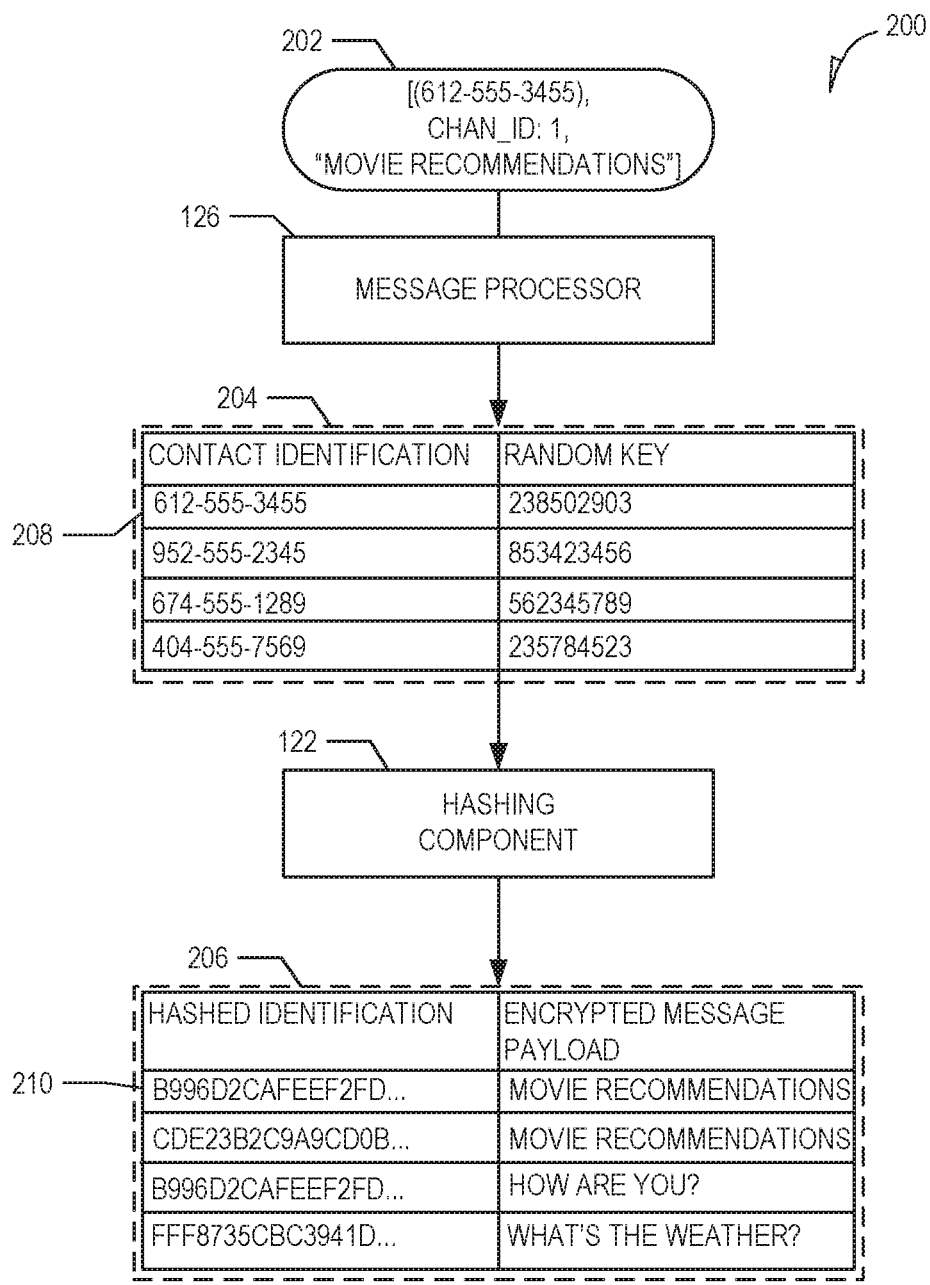
FIG. 2 illustrates a visualization of processing a data package, according to various examples.

FIG. 2 illustrates visualization 200 of processing a data package, according to various examples. Visualization 200 includes data package 202, contact table 204, message table 206, contact table entry 208, message processing 126, and hashing component 122. As illustrated, data package 202 includes a contact identification of "612-555-3455."

Message processing 126 may query contact table entry 208 using this identification to determine if a key exists for the contact identification. In this example, contact table entry 208 has a key value of "238502903." Using the contact identification and the key value, hashing component 122 may compute a hashed identification. Partial results of using the SHA-256 algorithm for a hash of "612-555-3455|238502903" are shown in message table entry 210. In some examples, hashing component 122 may compute a hashed identification using a hash-based message authentication code (HMAC). An HMAC may be based on the contact identification, the key value, and a secret key. Furthermore, the hashed identification is shown as associated with the message payload of data package 202. A data package may also include part of a previously generated key—for example, when the key has been split into multiple portions. The received portion may be combined (e.g., concatenated) with the stored portion to form the complete key before a hashed identification is computed.

In some examples, message processing 126 scrubs potential personally identifiable information (PII) from the message payload before storing it in message table 206. Potential PII may detected by matching regular expressions (e.g., 3 numbers, a dash, followed by 4 numbers) in the message. Other techniques may also be used without departing from the scope of this disclosure. Additionally, although the text in message table 206 is depicted as clear text, the text may be encrypted as stored on a storage device.

Figure 3:
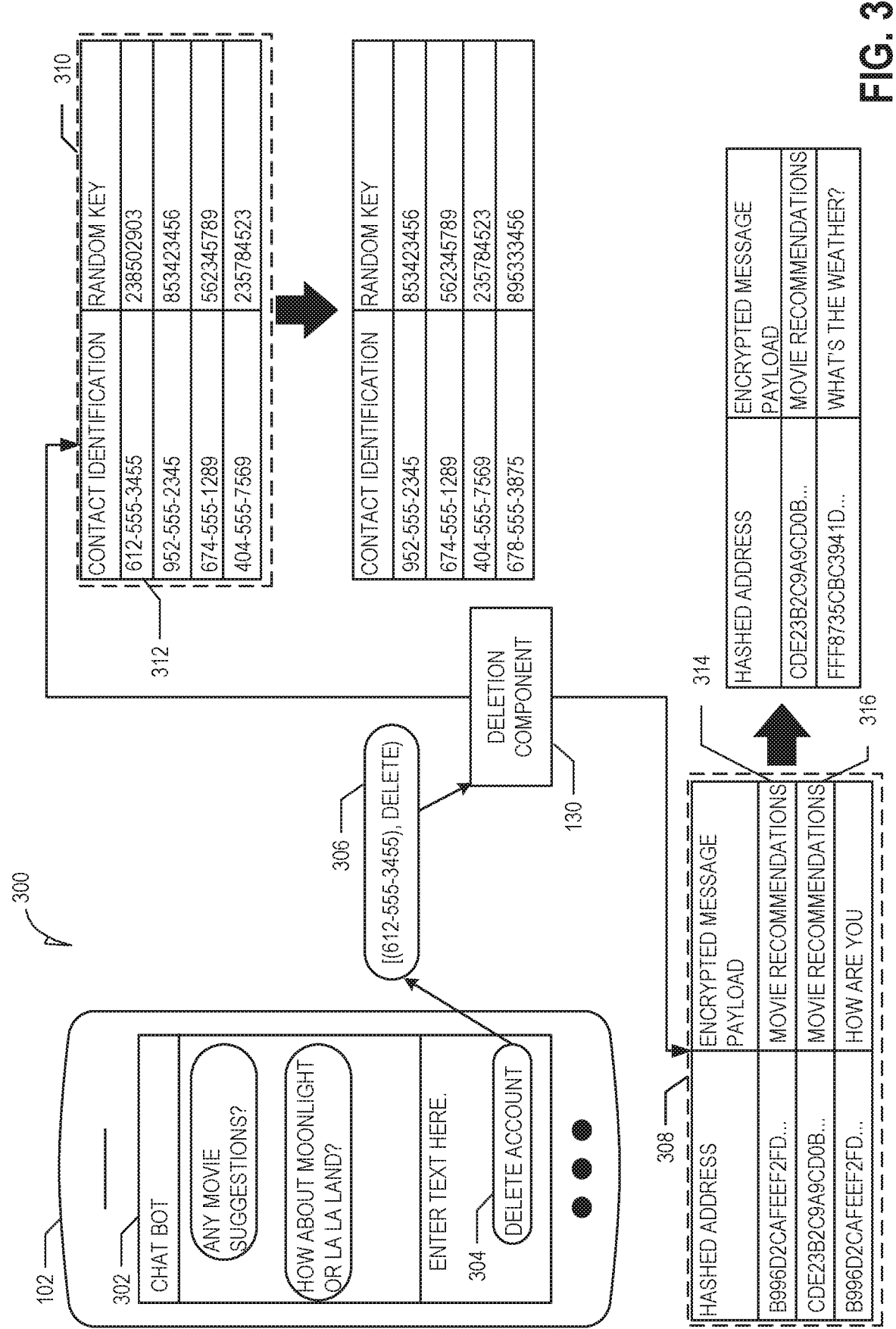
FIG. 3 illustrates a visualization of deleting a contact identification, according to various examples.

FIG. 3 illustrates a visualization 300 of deleting a contact identification, according to various examples. Visualization 300 includes message platform application 302, delete user interface element 304, data package 306, message table 308, contact table 310, computing device 102, and deletion component 130.

After a period of time, a user may want to remove all of their messages from identity privacy system 106, even if the user's identity has been obfuscated. For example, the user may be chatting with a chatbot using message platform application 302 and decides he or she wants to delete the user's account with respect to that chat bot. Upon activating delete user interface element 304, an API call, including data such as data package 306, may be transmitted to identity privacy system 106. Data package 306 may include two parameters, a contact identification and an action to take (e.g., "delete"). In some instances, a channel identification is also included the data package.

In an example, message processing 126 may route data package 306 to deletion component 130 based on the included action in data package 306. Deletion component 130 may then execute a deletion process. The deletion process may include two stages. The first stage may be to remove the association between the contact identification and a key. For example, contact table entry 312 may be deleted from contact table 310.

The second stage may be to remove all entries from message table 308 that have a hashed identification associated with the contact identification (e.g., message table entry 314 and message table entry 316). Again, the entries may be encrypted as stored, but are illustrated in plain text for convenience. Because the hashed identification is only computable given a key and contact identification, the hashed identification may be computed one final time before the contact table entry 312 is erased. All entries in message table 308 with the computed hash identification may then be removed. The second stage is optional in some examples.

One benefit of using the hashed identifications is that as soon as contact table entry 312 is deleted, a user may be assured (absent a successful brute force attack) that any associated messages may not be linked back to the user. This remains true regardless of whether the actual messages have been removed from message table 308.

In an example, the second stage may be performed in a batch fashion, at a time later than when contact table entry 312 is deleted. This may avoid repeated, potentially lengthy table scans, each time a user requests deletion. To implement the batch processing, deletion table 118 (with reference back to FIG. 1) may be populated with hash identifications calculated for the deleted accounts. Periodically, all entries in message table 308 that match one of the hashed identifications of deletion table 118 may be deleted. Then, the hashed identifications may be removed from deletion table 118.

Figure 4:
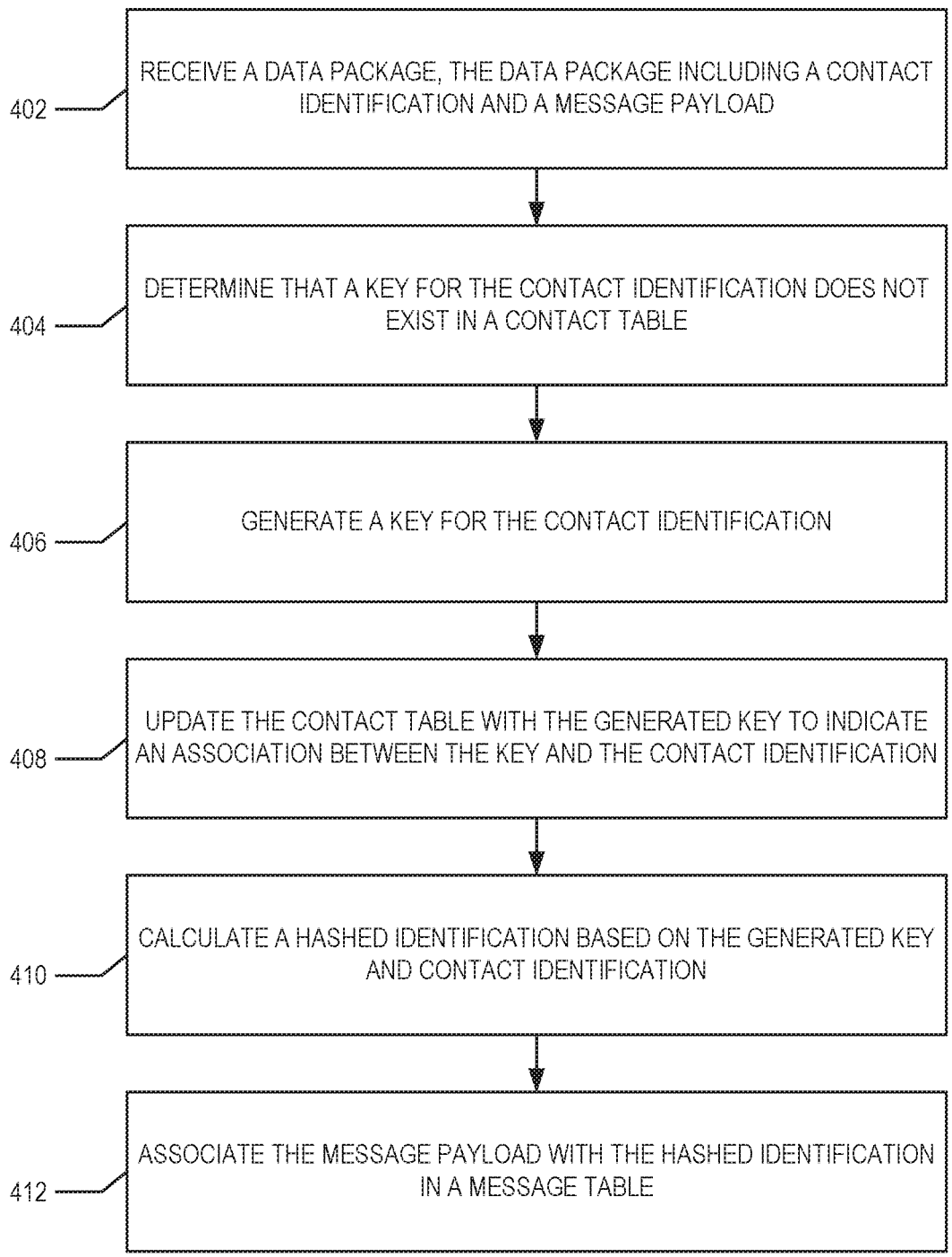

FIG. 4 illustrates a flowchart of a method of processing a data package, according to various examples. The flowchart illustrates a series of operations (402-412) that may be performed by one or more computing devices (e.g., computer system 500). Machine-readable code may be stored on the computing device and executed by a processing unit of the computing device. The executing code may configure and control other components of the computing device to perform the operations in the machine-readable code. For example, the processing unit may transmit instructions to a network interface to transmit a data stream or may instruct a storage device to store or delete data.

In an example, at operation 402 a data package is received. The data package may include a contact identification and a message payload (e.g., a message to be transmitted from one user to another). The data package may originate from a user computing device or message platform. The message payload may be a message transmitted to a chat bot. The message may be received by a system such as identity privacy system 106 via API 124.

In an example, at operation 404, a determination may be made that a key for the contact identification does not exist in a contact table. The determination may be made by querying the contact table with the contact identification. The format of the contact identification may be standardized before determining that the key for the contact identification does not exist in the contact table. Standardization may include removing or adding characters based on stored rules or templates. In some examples, the contact identification may be modified before the determination is made. For example, the contact identification may be modified (prepended and appended with data) based on a channel identification that identifies a namespace included in the data package. A database may queried using the channel identification or namespace to determine character to append/prepend to the contact identification.

In response to the determination, at operation 406, a key may be generated for the contact identification. The key may be generated using a random number generator. In an example, the random key generator from a piece of dedicated hardware. In an example, before generating the key, it may be determined that a request for generating the key has not previously been initiated for the contact identification. This determination may be made by checking the status of a lock of the random generator or querying a queue of pending requests.

In an example, at operation 408, the contact table may be updated with the generated key to indicate an association between the key and the contact identification. Updating may include adding an entry to the contact table with the contact identification and the generated key. The contact identification may be stored as standardized and modified, in an example.

Operations 404, 406, and 408 may be orchestrated using industry-standard concurrency techniques, such as optimistic concurrency. If optimistic concurrency is used, steps 404, 406, and, 408 may be symbolic.

In an example, at operation 410 a hashed identification may be calculated based on the generated key and contact identification. The calculation may include formatting a string with the contact identification and generated key according to a predefined format.

In an example, at operation 412, the message payload may be associated with hashed identification in a message table. Associating may include inserting an entry into the message table with the hashed identification and the message payload. The message payload may be sanitized before being stored in the message table. Sanitizing may include remove potential PII. Potential PII may be identified according regular expression, fuzzy logic, semantic analysis, etc. A threshold probability match may be used trigger removal of the PII from the message payload before storage.

In an example a request may be received to delete message payloads associated with the contact identification. For example, a request may be received at API 124 from the same computing device that originated the data package at operation 402. In response to the request, the generated key for the contact identification may be retrieved from the contact table. The hashed identification for the contact identification may be calculated based on the generated key and contact identification. The hashed identification may be stored in a deletion table. After storing the hashed identification, the contact identification and the generated key may be remove from the contact table.

In an example, a batch process may be used that retrieves hashed identifications from the deletion table. Then, a set of message payloads in the message table associated with one of the hashed identifications in the deletion table may be removed from the message table. To find associated message payloads, the message table may be queried, using the stored hashed identification in the deletion table, to obtain the set of result message payloads. After the message payloads have been removed, the hashed identifications may be removed from the deletion table.

In an example, a subsequent data package may be received with a subsequent contact identification and a subsequent associated message payload. The subsequent data package may have been transmitted from a different device and user than that in operation 402. It may be determined that a key for the subsequent contact identification exists in the contact table. Then, a subsequent hashed identification (e.g., the hashed identification for the subsequent user) may be calculated based on the key for the subsequent contact identification and subsequent contact identification. The subsequent message payload may be stored, as associated with the subsequent hashed identification, in the message table.

In another example, a subsequent data package (to the data package in operation 402) may be received with a subsequent contact identification and a subsequent associated message payload. For discussion purposes this subsequent data package may be considered a second data package with second contact identification and second message payload. It may be determined that a key for the second contact identification does not exist in the contact table. Based on this determination, a key may be generated for the second contact identification.

The key may be split into at least a first portion and a second portion. The first portion may be transmitted to a device associated with the second customer identification (e.g., as determined by a messaging platform or information gleaned from the received data package. The contact table may be updated with the second portion of the key to indicate an association between the subsequent contact identification and the second portion of the key. The first portion may not be stored in the contact table, in an example.

In an example, a third data package may be received that includes the second contact identification, a third message payload, and the first portion of the key. The second portion of the key may be accessed from the contact table. A hashed identification for the second contact identification may be calculated based on the first portion of the key, the second portion of the key, and the second contact identification. The third message payload may be stored, as associated with the hashed identification for the second contact identification, in the message table.

Embodiments described herein may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Components may be hardware, software, or firmware communicatively coupled to one or more processors in order to carry out the operations described herein. Components may be hardware components, and as such components may be considered tangible entities capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine-readable medium.

In an example, the software, when executed by the underlying hardware of the component, causes the hardware to perform the specified operations. Accordingly, the term hardware component is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the modules need not be instantiated at any one moment in time. For example, where the components comprise a general-purpose hardware processor configured using software; the general-purpose hardware processor may be configured as respective different components at different times. Software may accordingly configure a hardware processor, for example, to constitute a particular component at one instance of time and to constitute a different component at a different instance of time. Components may also be software or firmware components, which operate to perform the methodologies described herein.

Figure 5:
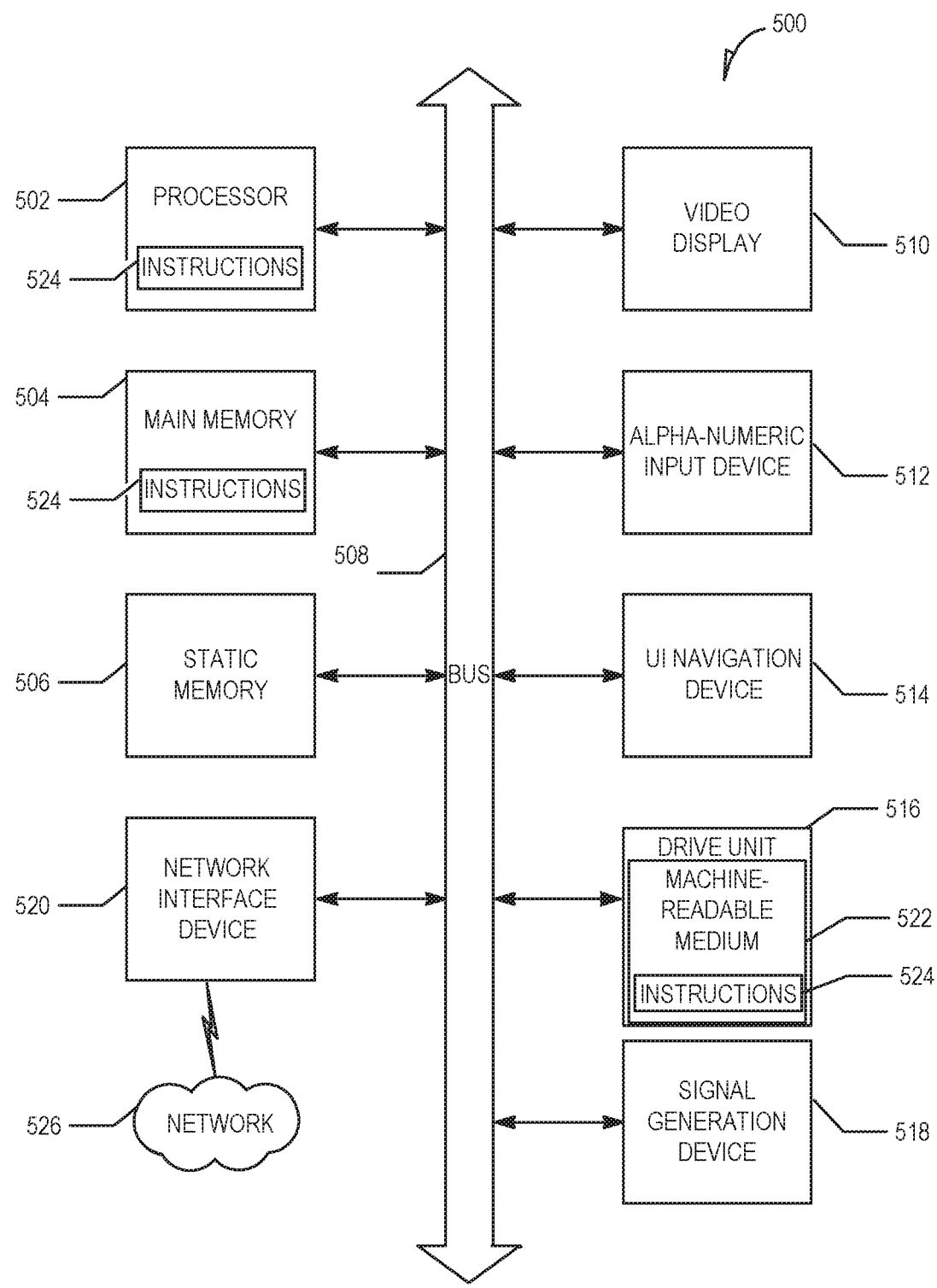
FIG. 5 is a block diagram illustrating an example machine upon which any one or more of the techniques (e.g., methodologies) discussed herein may be performed, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

The invention claimed is:

1. A method comprising:
   receiving a data package, the data package including a contact identification and a message payload;
   in response to determining that a key for the contact identification does not exist in a contact table:
      generating a generated key for the contact identification;

updating the contact table with the generated key to indicate an association between the generated key and the contact identification;
calculating a hashed identification based on the generated key and the contact identification; and
associating the message payload with the hashed identification in a message table;
receiving a subsequent data package, the subsequent data package including a subsequent contact identification and a subsequent message payload; and
in response to determining that a subsequent key for the subsequent contact identification exists in the contact table:
calculating a subsequent hashed identification based on the subsequent key for the subsequent contact identification and the subsequent contact identification; and
associating the subsequent message payload with the subsequent hashed identification in the message table.

2. The method of claim 1, wherein the data package includes a channel identification that identifies a namespace, and wherein the method further comprises, before determining that the key for the contact identification does not exist in the contact table, modifying the contact identification based on the channel identification.

3. The method of claim 2, wherein updating the contact table with the generated key includes storing the contact identification as associated with the generated key, the contact identification stored as modified based on the channel identification.

4. The method of claim 1, further comprising:
before generating the key, determining that a request for generating the key has not previously been initiated for the contact identification.

5. The method of claim 1, wherein generating the key comprises generating a random key.

6. The method of claim 1, further comprising:
standardizing a format of the contact identification before determining that the key for the contact identification does not exist in the contact table.

7. The method of claim 1, further comprising:
sanitizing the message payload to remove potential personally identifying information.

8. The method of claim 1, further comprising:
receiving a request to delete message payloads associated with the contact identification; and
in response to the request:
retrieving the generated key from the contact table;
calculating the hashed identification based on the generated key and the contact identification;
storing the hashed identification in a deletion table; and
removing the contact identification and the generated key from the contact table.

9. The method of claim 8, further comprising:
querying the message table using the stored hashed identification in the deletion table to obtain a set of result message payloads;
deleting the set of result message payloads from the message table; and
after deleting the set of result message payloads, deleting the hashed identification from the deletion table.

10. The method of claim 1, further comprising:
in response to determining that the subsequent key for the subsequent contact identification does not exist in the contact table:
generating the subsequent key for the subsequent contact identification;
splitting the subsequent key for the subsequent contact identification into at least a first portion and a second portion;
transmitting the first portion of the subsequent key to a device associated with the subsequent contact identification; and
updating the contact table with the second portion of the subsequent key to indicate an association between the subsequent contact identification and the second portion of the subsequent key.

11. The method of claim 10, further comprising:
receiving a third data package, the third data package including the subsequent contact identification, a third message payload, and the first portion of the subsequent key;
accessing the second portion of the subsequent key from the contact table;
calculating a hashed identification for the subsequent contact identification based on the first portion of the subsequent key, the second portion of the subsequent key, and the subsequent contact identification;
associating the third message payload with the hashed identification for the subsequent contact identification in the message table.

12. A non-transitory computer-readable medium comprising instructions, which when executed by at least one processor, configure the at least processor to perform operations comprising:
receiving a data package, the data package including a contact identification and a message payload;
in response to determining that a key for the contact identification does not exist in a contact table:
generating a generated key for the contact identification;
updating the contact table with the generated key to indicate an association between the generated key and the contact identification;
calculating a hashed identification based on the generated key and the contact identification; and
associating the message payload with the hashed identification in a message table;
receiving a subsequent data package, the subsequent data package including a subsequent contact identification and a subsequent message payload; and
in response to determining that a subsequent key for the subsequent contact identification exists in the contact table:
calculating a subsequent hashed identification based on the subsequent key for the subsequent contact identification and the subsequent contact identification; and
associating the subsequent message payload with the subsequent hashed identification in the message table.

13. The non-transitory computer-readable medium of claim 12, the operations further comprising:
receiving a request to delete message payloads associated with the contact identification; and
in response to the request:
retrieving the generated key from the contact table;
calculating the hashed identification based on the generated key and the contact identification;
storing the hashed identification in a deletion table; and
removing the contact identification and the generated key from the contact table.

14. The non-transitory computer-readable medium of claim 13, the operations further comprising:
  querying the message table using the stored hashed identification in the deletion table to obtain a set of result message payloads;
  deleting the set of result message payloads from the message table; and
  after deleting the set of result message payloads, deleting the hashed identification from the deletion table.

15. The non-transitory computer-readable medium of claim 12, the operations further comprising:
  in response to determining that the subsequent key for the subsequent contact identification does not exist in the contact table:
  generating the subsequent key for the subsequent contact identification;
  splitting the subsequent key for the subsequent contact identification into at least a first portion and a second portion;
  transmitting the first portion of the subsequent key to a device associated with the subsequent contact identification; and
  updating the contact table with the second portion of the subsequent key to indicate an association between the subsequent contact identification and the second portion of the subsequent key.

16. A system comprising:
  at least one processor;
  a storage device comprising instructions, which when executed by at the least one processor, configure the at least processor to:
  receive a data package, the data package including a contact identification and a message payload;
  in response to a determination that a key for the contact identification does not exist in a contact table:
  generate a generated key for the contact identification;
  update the contact table with the generated key to indicate an association between the generated key and the contact identification;
  calculate a hashed identification based on the generated key and the contact identification; and
  associate the message payload with the hashed identification in a message table;
  receive a subsequent data package, the subsequent data package including a subsequent contact identification and a subsequent message payload; and
  in response to a determination that a subsequent key for the subsequent contact identification exists in the contact table:
    calculate a subsequent hashed identification based on the subsequent key for the subsequent contact identification and the subsequent contact identification; and
    associate the subsequent message payload with the subsequent hashed identification in the message table.

17. The system of claim 16, wherein the at least one processor is further configured, when executing the instructions, to:
  receive a request to delete message payloads associated with the contact identification; and
  in response to the request:
    retrieve the generated key from the contact table;
    calculate the hashed identification based on the generated key and the contact identification;
    store the hashed identification in a deletion table; and
    remove the contact identification and the generated key from the contact table.

18. The system of claim 17, wherein the at least one processor is further configured, when executing the instructions, to:
  query the message table using the stored hashed identification in the deletion table to obtain a set of result message payloads;
  deletion the set of result message payloads from the message table; and
  after the deletion of the set of result message payloads, delete the hashed identification from the deletion table.

19. The system of claim 16, wherein the at least one processor is further configured, when executing the instructions, to:
  in response to a determination that the subsequent key for the subsequent contact identification does not exist in the contact table:
  generate the subsequent key for the subsequent contact identification;
  split the subsequent key for the subsequent contact identification into at least a first portion and a second portion;
  transmit the first portion of the subsequent key to a device associated with the subsequent contact identification; and
  update the contact table with the second portion of the subsequent key to indicate an association between the subsequent contact identification and the second portion of the subsequent key.

\* \* \* \* \*